United States Patent

Bonafino et al.

[15] 3,706,370

[45] Dec. 19, 1972

[54] CONVEYOR SYSTEM

[72] Inventors: Edward J. Bonafino, Endwell; Frederick W. Doolittle, Binghamton; Charles U. Hayes; James C. Yarrington, both of Endicott, all of N.Y.

[73] Assignee: International Business Machines Corporation, Armonk, N.Y.

[22] Filed: Dec. 21, 1970

[21] Appl. No.: 100,056

[52] U.S. Cl. .................................. 198/76, 198/203
[51] Int. Cl. ...................... B65g 23/26, B65g 23/36
[58] Field of Search ................. 198/82, 203, 75–76; 271/76; 74/219, 661

[56] References Cited

UNITED STATES PATENTS

| 1,749,852 | 3/1930 | Smith | 198/203 |
| 2,071,778 | 2/1937 | Walne | 74/661 |
| 3,214,998 | 11/1965 | Hall | 74/661 |

FOREIGN PATENTS OR APPLICATIONS

| 747,317 | 4/1956 | Great Britain | 198/76 |

Primary Examiner—Edward A. Sroka
Attorney—Hanifin & Jancin and P. M. Brannen

[57] ABSTRACT

A conveyor system comprising a plurality of tandem conveyor sections, each having an associated driver or power means, adjacent sections being coupled to each other by overrunning clutches, so that downstream sections can operate as fast or faster than upstream sections.

7 Claims, 2 Drawing Figures

PATENTED DEC 19 1972　　　　　　　　　　3,706,370
FIG. 1
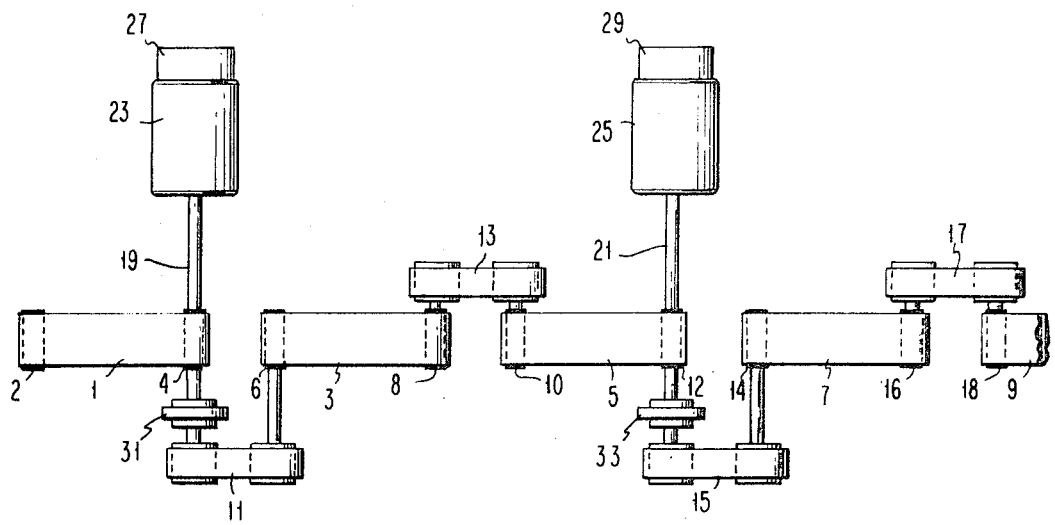
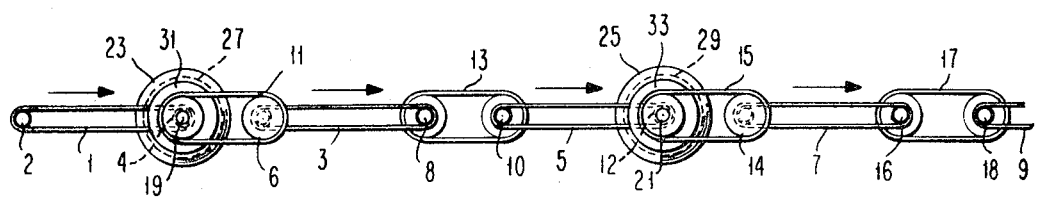
FIG. 2
INVENTORS
EDWARD J. BONAFINO
FREDERICK W. DOOLITTLE
CHARLES U. HAYES
JAMES C. YARRINGTON
BY Paul M. Brannen
AGENT 3,706,370

CONVEYOR SYSTEM

FIELD OF INVENTION

This invention relates generally to conveyor systems, and more particularly to document transport systems having a plurality of sections, arranged so that document buckling is prevented.

DESCRIPTION OF THE PRIOR ART

Conveyor systems having a plurality of tandem conveyor belts or sections are known. Generally, these have utilized a single driving motor of sufficient capacity to drive the entire conveyor system through appropriate power couplings to the various sections, or else have required expensive synchronously operating individual motors, if the speed of the various sections is to remain the same.

SUMMARY OF THE INVENTION

It is a general object of this invention to provide an improved conveyor system having a plurality of conveyor sections, in which the downstream sections can operate at least as fast as the upstream sections.

Another object of the invention is to provide an improved document transport system utilizing a plurality of tandemly arranged transport belts, in which document buckling or jamming is prevented.

A further object of the invention is to provide an improved document transport system employing a plurality of non-synchronous drive motors driving their respective sections, which sections are coupled to each other through overrunning clutches, so that the downstream sections can operate at least at the speed of the upstream sections.

In practicing the invention, each section of a conveyor system having a plurality of sections in tandem is connected to the adjacent section by suitable unidirectional clutch means. Each section is driven by a shaft which is coupled to an associated drive motor and brake. The clutch is disposed and arranged so that downstream sections of the conveyor can overrun upstream portions of the conveyor.

DESCRIPTION OF THE DRAWINGS

In the drawing:

FIG. 1 is a highly schematic plan view of a conveyor system embodying the present invention, and FIG. 2 is an elevation view of the arrangement shown in FIG. 1.

DESCRIPTION OF A PREFERRED EMBODIMENT

Referring to FIGS. 1 and 2 of the drawings, reference characters 1, 3, 5, 7 and 9 designate a succession of endless belts arranged to form a plurality of conveyor sections, particularly suited for the transport of documents. The documents move in the direction shown by the arrows, in accordance with the motion of the belts. The documents or articles to be conveyed may be held in engagement with the surfaces of the conveyor or transport belts by weight alone, or by confronting rollers or belts, not shown, since they are not pertinent to the invention.

The belts are carried by a series of pulleys or rolls 2, 4, 6, 8, 10, 12, 14, 16 and 18, supported by suitable bearings, not shown for purposes of simplifying the drawings. Adjacent pulleys at adjacent non-driven ends of the transport belts are coupled by suitable coupling means, such as a plurality of conventional timing belts 13 and 17. Other couplings may be employed such as suitable gearing, etc.

The above-described combination therefore comprises a plurality of conveyor sections, coupled together so that the belts can all travel at the same speed, or substantially so, taking into consideration the resiliency inherent in the system, especially in the couplings between belts. Because of the clutches, however, the downstream sections can travel faster than the upstream sections.

Power for driving the conveyor sections is supplied by a plurality of drive shafts, such as 19 and 21, directly coupled to the appropriate pulleys such as 4 and 12. The shafts are driven by a corresponding plurality of drive motors 23, 25, each having associated therewith a brake 27, 29. The drive shafts are coupled to the non-drive end of the adjacent conveyor section via unidirectional or overrunning clutches 31, 33, of conventional type, such as roller clutches, and via timing belts 11, 15.

Accordingly, if a downstream conveyor section, such as that comprising belts 3 and 5, is moving at a speed higher than that of the associated drive shaft and pulley at the upstream section, it will not affect the speed of the upstream section, including motor 23, but will simply overrun it. On the other hand, the upstream motors such as 23 are able to drive slower downstream sections and motors and assist the downstream motors to maintain speed. Such operation is necessary if document buckling or jamming are to be prevented. The brakes 27, 29 are applied simultaneously, by means not shown, to bring the entire system to a stop. Because of the clutches, the downstream brakes can assist the upstream brakes in stopping the conveyor. Also, selective application of the brakes, transport run-out downstream of any clutch may be obtained.

From the foregoing, it will be apparent that the present invention provides an improved transport or conveyor system, in which a plurality of drive shafts are enabled to operate at the same speed, or downstream shafts can operate faster, but not slower than upstream shafts.

While the invention has been particularly shown and described with reference to a preferred embodiment thereof, it will be understood by those skilled in the art that various changes in form and details may be made therein without departing from the spirit and scope of the invention.

What is claimed is:

1. In combination, a plurality of drive shafts which must be braked simultaneously or in a sequence which requires shafts to be braked in a sequence in which a first shaft is stopped first, a following shaft is stopped next, and following shafts are stopped in their successive order, and in which said plurality of shafts must all be driven at the same speed, or in a sequence in which the shafts successively following the first shaft are driven at speeds as high or higher than the speed of said first shaft, the combination comprising a plurality of driving motors, one for each of said shafts, coupled to the associated shafts, a corresponding plurality of brake devices, one for each of said motors, coupled to the associated motor shaft, a corresponding plurality of unidirectional clutch mechanisms, one for each of said shafts, for operatively connecting adjacent drive shafts, said unidirectional clutches being oriented so that drive shafts following the first shaft can overrun preceding shafts.

2. The combination as claimed in claim 1, in which each of said drive shafts drives a section of a document conveyor, in which downstream sections must move documents as fast or faster than preceding sections in order to avoid document jams.

3. The combination as claimed in claim 2, in which a plurality of conveyor belts are provided in each card section, and resilient coupling means are provided for coupling the successive belts in each section.

4. The combination as claimed in claim 3, in which said resilient coupling means includes a timing belt.

5. A conveyor system having a plurality of conveyor sections, a plurality of driving means, one for each of said sections, and a plurality of overrunning clutches, one for each of said sections, for coupling adjacent sections, said clutches being arranged so that an upstream conveyor section can drive downstream sections which are slower, and downstream sections can overrun the speed of an adjacent upstream section, and braking means for each of said driving means.

6. A conveyor system as claimed in claim 5, in which each of said conveyor sections comprises an endless belt, and said coupling means comprise a timing belt for coupling adjacent sections.

7. A conveyor system as claimed in claim 6, in which each of said conveyor sections is adapted to convey documents.

* * * * *